United States Patent [19]

Sledzinski et al.

[11] 3,928,586
[45] Dec. 23, 1975

[54] O,O-DIETHYL-0-1-(2,4-DICHLOROPHENYL)-2,2-DIBROMOVINYL PHOSPHATE USED TO CONTROL THE COLORADO POTATO BEETLE

[75] Inventors: Bohdan Śledzinski; Józef Kroczyński, both of Warsaw; Andrzej Zwierzak, Lodz; Ludwika Cieślak; Aleksander Majda, both of Warsaw, all of Poland

[73] Assignee: Instytat Przemyslu Organicznego, Warsaw, Poland

[22] Filed: July 27, 1973

[21] Appl. No.: 383,459

[30] Foreign Application Priority Data

Aug. 1, 1972 Poland .................................. 157044
Nov. 21, 1972 Poland ................................ 158980

[52] U.S. Cl. ................................ 424/219; 260/957
[51] Int. Cl.² ............................................ A01N 9/36
[58] Field of Search ..................... 424/219; 260/957

[56] References Cited
UNITED STATES PATENTS

| | | | |
|---|---|---|---|
| 3,003,916 | 10/1961 | Gilbert et al. | 260/957 X |
| 3,102,842 | 9/1963 | Phillips et al. | 424/219 |
| 3,134,713 | 5/1964 | Gilbert et al. | 424/219 |

*Primary Examiner*—Leonard Schenkman
*Attorney, Agent, or Firm*—Hasteltine, Lake & Waters

[57] ABSTRACT

An 0,0-diethyl-0-1-(2,4-dichlorophenyl)-2,2-dibromivinyl phosphate of the formula

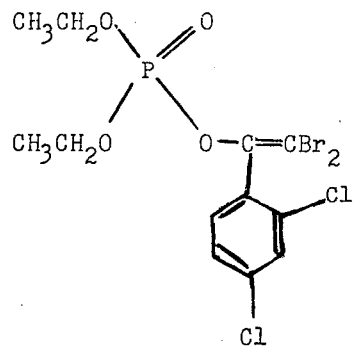

is useful as an insecticide, especially for Colorado potato beetles, and can be prepared by reacting 2,2,2-tribromo-2',4'-dichloroacetophenone with triethyl phosphite, or, alternatively, by reacting phosphoryl chloride with 2,2-dibromo-2',4'-dichloroacetophenone in the presence of an alkaline agent, preferably a t-aliphatic amine, and esterifying the resultant product in the presence of a hydrochloride acceptor, preferably pyridine or triethylamine.

1 Claim, No Drawings

O,O-DIETHYL-O-1-(2,4-DICHLOROPHENYL)-2,2-DIBROMOVINYL PHOSPHATE USED TO CONTROL THE COLORADO POTATO BEETLE

BACKGROUND OF THE INVENTION

1. Field of the Invention

This invention relates to an enol phosphate, particularly that of a novel dialkyl dihalovinyl phosphate, its methods of preparation, and its use as an insecticide. More particularly, this invention relates to a novel O,O-diethyl-O-1-(2,4-dichlorophenyl)-2-dibromovinyl phosphate, its methods of preparation, formulations or insecticidal compositions thereof, and their use as insecticides.

2. Description of Prior Art

Insecticides heretofore used have been characterized by a relatively broad spectrum of biological activity. These agents, however, have been destructive not only to harmful insects but also to useful organisms, thereby destroying the biological balance in the natural habitat. Under these circumstances, therefore, the prior art has attached particular importance to the desire to dispose of such substances with such limited biological activity due to the damage of great economical importance their use entails. Thus, greater and greater importance has become attached to discovering insecticides having biological activity for a narrow range of insects, particularly for a given insect, without otherwise causing harm in the natural habitat.

Of the many known insecticides, only a few exhibit strong potato-beetle killing action. The Colorado potato-beetle (Leptinotarsa decemlineata Say.), in particular, shows, in addition to a natural resistance against the action of insecticides, a special capacity to develop acquired resistance.

Prior art insecticides now used to kill the Colorado potato-beetle include those with the common names lindane (hexachlorocyclohexane); chlorphenvinphos (O,O-diethyl-O-1-(2,4-dichlorophenyl)-2-chlorovinyl-phosphate and propoxur (o-isopropoxyphenyl N-methylcarbamate). The Colorado potato-beetle killing activity distinguishing these insecticides is, however, accompanied by a number of essential negative features, apart from their wide spectrum of insecticidal action.

Lindane belongs to a class of chlorinated hydrocarbons that requires long residence times in the environment of the insect to be killed. This feature, however, reduces to a great extent its usefulness for killing the Colorado potato-beetle. Chlorphenvinphos, being a phosphoroorganic compound, easily susceptible to decomposition, is distinguished by its strong toxicity to warm-blooded organisms. This unfavorable feature tends to make individual users limit its use. Propoxur, while less toxic than chlorphenvinphos, is also a less effective insecticide against the Colorado potato-beetle.

Enol phosphates per se are known in the art and include compounds such as the following: O,O-diethyl-O-1-(halophenyl)-2-chlorovinylphosphates such as the 2, 4-dichloro-, 2, 5-dichloro-, 2, 6-dichloro-, 3-bromo-6-chloro-, 3-bromo-6-fluoro- and 2-fluoro-5-bromophenyl; O,O-dialkyl-O-1-(tri-, tetra- and pentachloro- or bromophenyl)-2-chloro-vinylphosphates; O,O-dimethyl-O-1-(2, 5-dichlorophenyl)-2-chlorovinylphosphate; O,O-dimethyl-O-1-(halophenyl)-2-chlorovinylphosphates such as the 2, 4-dichloro-, 2,5-dichloro- and 2-bromo-4-chlorophenyl; O,O-dialkyl-O-1-(dibromophenyl)-2-chlorovinylphosphates; and O,O-dialkyl-O-1-(dichloro- and trichlorophenyl)-2-chlorovinylphosphates. Some of the foregoing compounds are known to have parasiticidal and insecticidal activity.

SUMMARY OF THE INVENTION

In accordance with this invention, there is provided a novel O,O-diethyl-O-1-(2,4-dichlorophenyl)-2,2-dibromovinyl phosphate of the formula:

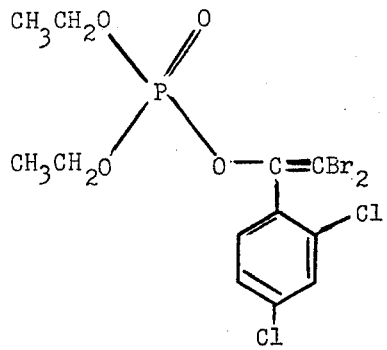

Like chlorphenvinphos, this compound displays strong insecticidal activity against the Colorado potato-beetle, as is shown below in Table 1, a much more insecticidally resistant form of this pest than its larval form. However, relative to other organisms, as shown below in Tables 2 and 3, the present compound is much less toxic when compared with known insecticides. These differences in biological activity are illustrative of the selective biological activity of the present compound. As can be seen in Table 4 below, the present compound is much less toxic toward warm-blooded organisms than chlorphenvinphos.

DESCRIPTION OF PREFERRED EMBODIMENTS

The enol phosphate of this invention, i.e., O,O-diethyl-O-1-(2,4-dichlorophenyl)-2,2-dibromovinyl phosphate can be prepared by a number of suitable alternative methods. It can be prepared, for example by condensing triethyl phosphite with 2,4-dichlorphenacylidyne bromide (2,2,2-tribromo-2',4'-dichloroacetophenone) at an elevated temperature in the presence of or without an organic solvent. The resulting product, obtained in a high yield of 95%, is purified by evaporation of its volatile components at an elevated temperature and under reduced pressure or by high-vacuum distillation. The purity of the final compound was ascertained by means of thin-layer chromatography and gas chromatography, and its structure was determined by conventional infrared (IR) spectrometry, nuclear magnetic resonance (NMR), and elemental analysis.

The triethyl phosphite starting material can be obtained by means of the generally known method of esterification of phosphorus trichloride with ethyl alcohol in the presence of hydrogen chloride as a binding agent.

2,4-dichlorophenacylidynebromide, the main intermediate product in the synthesis of the present compound, is obtained by exhaustive bromination of the side chain of 2,4-dichloroacetophenone, 2,2',4'-bromodichloroacetophenone, or 2,2,2',4'-dibromodichloroacetophenone in the presence of an alkali metal salt or an ammonium salt of a lower alkanocarboxylic acid, especially of sodium acetate or ammonium acetate.

The present compound can also be obtained in accordance with another synthesis method of this invention by reacting 2,4-dichlorophenacylidene bromide with phosphorus oxychloride in the presence of a base, preferably in the presence of an aliphatic tertiary amine or by esterification of the product obtained with ethanol in the presence of a hydrogen chloride binding agent, preferably in the presence of pyridine or triethylamine.

The method or process of producing the present compound can be effected in two successive stages, utilizing a common apparatus. The 2,4-dichlorophenacylidenebromide, used as an intermediate, is obtained by the known method of bromination of 2,4-dichloroacetophenone in the presence of a solvent.

The insecticide of the present invention can be used in any of the forms in which insecticides are commonly employed such as solutions, emulsions, dusts, wettable powders, aerosols, and the like. It can be used alone in the pure form or in combination with conventional agricultural carriers, additives and/or formulating agents such as solvents, solid inert carriers, emulsifiers, dispersing agents, wetting agents, adherence-improving agents, etc. A suitable solvent, e.g., would include: xylene, dioctylphthalate; a suitable emulsifier would include, e.g., polyoxyethylenenamylphenol, etc.; a suitable carrier, e.g., would include kaolin; a suitable dispersing agent, e.g., would include waste sulphite liquors; a suitable wetting agent, e.g., would include a condensation product of oleic acid chloride with N-methyl taurine; and a suitable agent for improving adherence, e.g., would include polyvinyl alcohol.

The present compound may also be mixed with known insecticides such as red-spider killing agents, fungicides, plant growth regulators, synergetic agents, attractants; it may also be added into the composition of multicomponent mixtures.

The present invention is further illustrated in greater detail by the following examples, Examples 1–8, but it is to be understood that the present invention, in its broadest aspects, is not necessarily limited in terms of the reactants, or specific temperatures, residence times, separation techniques, and other process conditions, etc.; or dosage levels, exposure times, test insects used, etc., by which the compound and/or compositions thereof described and claimed are prepared and/or used.

EXAMPLE 1

Potato-beetle killing action

Potato-beetle killing properties were determined on 14 day old potato-beetles, by treating them with various doses of the present compound, O,O-diethyl-O-1-(2,4-dichlorophenyl)-2,2-dibromovinyl phosphate, dissolved in acetone. The so-called "topical method" was used. The results were calculated after 48 hours using the logarithmic-probite method and were compared with the results obtained with known potato-killing insecticides. The results are shown in Table 1 below:

Table 1

| Compound | $LD_{50}$ in µg/beetle |
| --- | --- |
| present compound | 1.80 |

Table 1-continued

| Compound | $LD_{50}$ in µg/beetle |
| --- | --- |
| lindane | 0.74 |
| chlorophenvinphos | 1.24 |
| propoxur | 2.44 |
| carbaryl | 109.0 |
| DDT | 153.0 |

EXAMPLE 2

Insecticidal action

The insecticidal properties of a number of compounds tested in Example 1 were determined on 4 day-old female specimens of the common house-fly (musca domestica) and on 21 day-old nymphs of the ordinary cockroach (Blatta orientalis) by treating them at different dosage levels. Each of the compounds tested was dissolved in acetone, and the "topical method" was again employed.

The results were calculated after 24 hours and the mortality was expressed in percent for each dose. The action upon the corn weevil (Calandra granaria) was determined by exposing 7 day-old corn-weevils, on Petri dishes covered with filter paper discs, to acetone solutions of the present compound in different concentrations, applied to the filter paper discs. The insects were placed on dishes, the results were calculated after 48 hours, and the mortality was expressed in percent. The results are shown below in Table 2.

Table 2

| Compound | House fly | Cockroach | Corn Weevil |
| --- | --- | --- | --- |
|  | $LD_{90}$ | $LD_{90}$ | $LD_{90}$ |
| Present compound | 2.5 | 5.0 | 0.1 |
| chlorphenvinpos | 0.06 | 0.332 | 0.009 |
| propoxur | 0.6 | 0.026 | 0.007 |

EXAMPLE 3

Plant louse killing and red spider killing action

These properties were determined by exposing nymphs of the pea aphid (Acyrthosiphon pisi) and specimens of full-grown red spiders (Tetranychus urtice) on broad bean leaves (plant louses) and on bean leaves (red spider), previously dipped in an aqueous acetone emulsion of different concentrations of the compound being examined. The results for the plant louse were calculated after 24 hours and those for the red spider were calculated after 48 hours; and the mortality was expressed in per cent. The results are shown below in Table 3.

Table 3

| Compound | Pea aphid | Red spider |
| --- | --- | --- |
|  | $LD_{90}$ | $LD_{90}$ |
| Present compound | 0.1 | 0.1 |
| chlorphenvinphos | 0.03 | 0.0056 |
| propoxur | 0.0058 | 0.0267 |

EXAMPLE 4

Acute toxicity for higher animals

The toxicity for warm-blooded animals was determined by oral administration, to white rats, of the present compound in the form of an emulsion and in different concentrations. The results were calculated after 14 days of observation and the $LD_{50}$ per os was determined. The values obtained were compared with the $LD_{50}$ per os of known potato-beetle killing insecticides. The results are shown below in Table 4.

Table 4

| Compound | $LD_{50}$ per os (in mg/kg of rat) |
| --- | --- |
| Present compound | 110 |
| lindane | 88 – 91 |
| chlorphenvinphos | 14.9 – 16.9 |
| propoxur | 83 – 86 |

EXAMPLE 5

Preparation of O,O-diethyl-O-1-(2,4-dichlorophenyl)-2,2-dibromovinyl phosphate

Into a glass flask provided with a mixer, thermometer, dropping funnel, and reflux condenser to which a hydrogen bromide absorber was connected, 47.2 g (0.25 mole) of 2,4-dichloroacetophenone and 300 ml of carbon tetrachloride were introduced. The solution was heated to a temperature of 70°C., and bromine was added thereto dropwise. When the mixture ceased to get decolorized, a 41 g portion (0.5 mole) of sodium acetate was introduced, while continuing the dosage of bromine.

After the addition, drop-by-drop of 125 g (0.785 mole) of bromide, the content of the flask was mixed for 30 minutes, cooled down, and the precipitated sodium bromide, as well as the excess of sodium acetate, were filtered off.

The solvent was removed from the filtrate by distillation, and the remainder was kept for 1 hour at a temperature of 100°C. under a pressure of 10 mm Hg to remove the volatile components.

102 g of 2,4-dichlorophenacylidyne bromide were obtained, at a yield of 95 % having the following properties: $n_D^{20}$: 1.6375; and boiling point 138°–139°C. at 0.2 mm Hg.

Into a flask equipped as above, 102 g (0.237 mole) of 2,4-dichlorophenacylidyne bromide and 100 ml. of benzene were then introduced. Into this solution, while it was being stirred and maintained at a temperature of 50°–60°C., were added dropwise 45 g (0.27 mole) of triethyl phosphite. The flask content was heated for 1 hour at a temperature of 90°–100°C., whereupon the ethyl bromide and the solvent were evaporated under reduced pressure. The remainder was kept for 1 hour at a temperature of 100°C., under a pressure of 1 mm Hg, thereby removing the excess of triethyl phosphite. Obtained were 110 g of O,O-diethyl-O-1-(2,4-dichlorophenyl)-2,2-dibromovinyl phosphate, with a yield of 95 %; $n_D^{20}$ — 1.5575; boiling point 140°–144°C., at 0.005 mm Hg.

EXAMPLE 6

Into a 250 ml holding glass flask provided with a mixer, a dropping funnel, a thermometer and protection against moisture access, 23 g (0.15 mole) of phosphorus oxychloride, 34.7 g (0.10 mole) of 2,4-dichlorophenacylidenebromide and 150 ml of toluene were introduced. The flask was mixed and its contents were cooled down to a temperature of −20°C., and 12.1 g (0.12 mole) of triethylamine were added dropwise, temperature being maintained during the addition. Then the flask content was stirred for 1 hour at a temperature of from −10° to 0°C., and for 2 hours from 0° to 20°C. The reaction mixture was filtered and the aminohydrochloride precipitate was washed twice with portions of 25 ml of toluene, whereupon the filtrate portions were combined with the main filtrate. From the combined filtrate, the toluene, the excess of phosphorus oxychloride, and the amine were removed by distillation, by heating the filtrate to a temperature of 80°C., under a pressure of about 10 mm Hg. Obtained was technical grade O-1-(2,4-dichlorophenyl)-2,2-dibromovinylphosphoryldichloride in an amount of 43 g. Then, 43 g of the substance obtained and 150 ml of toluene were placed in the reaction flask. The flask content was stirred and cooled down to a temperature of −15°C., and a mixture of 9.2 g (0.2 mole) of ethanol, and 16.6 g (0.21 mole) of pyridine was added dropwise, the temperature being maintained during the addition.

The flask content was stirred for 4 hours, and the temperature was slowly increased to 20°C. The reaction mixture was filtered, and the pyridine hydrochloride precipitate washed twice with 50 ml. portions of toluene, combining the filtrate portions with the main filtrate. The combined filtrate was washed, while stirring, successively with 50 ml. of a 2% hydrochloric acid solution, 50 ml. of a 2% aqueous potassium carbonate solution, and 50 ml. of water. The washed organic layer was dried over anhydrous magnesium sulphate, and the solvent was removed by heating to a temperature of 100°C., under a pressure of up to 20 mm Hg.

Obtained were 46.8 g of a raw product from which, by high vacuum distillation, 42.7 g of O,O-diethyl-O-1-(2,4-dichlorophenyl)-2,2-dibromovinylphosphate was separated, and the fraction boiling at a temperature of 133°–137°C., at 0.001 mm Hg, was collected. The main component in the distillate amounted to 97.9%, and the yield amounted to 86%, calculated in terms of the pure product. The index of refraction was $n_D^{20}$ — 1.5574. In the IR spectrum the present compound exhibited absorption bands of 1618, 1290–1287 and 1038–1022 $cm^{-1}$, characteristic respectively of the bonds C = C (vinyl); P = O; and P — O — C.

Elemental Analysis

For the empirical formula $C_{12}H_{13}Br_2Cl_2O_4P$, the following results were obtained:

| | | | |
| --- | --- | --- | --- |
| calculated | 29.8% C, | 2.70% H, | 6.45% P. |
| obtained | 29.5% C, | 2.65% H, | 6.56% P. |

EXAMPLE 7

An insecticidal composition or formulation in the form of a 50% solution for emulsification, was obtained by mixing 525 g of a 95% concentrate of O,O-diethyl-O-1-(2,4-dichlorophenyl)-2,2-dibromovinyl phosphate with 450 g of o-xylene and 25 g of a mixture of anionic (not ionic) emulsifying agents.

An insecticidal preparation in the form of a 50% suspension powder was obtained by preliminarily mixing, in a pan crusher, 525 g of a 95% concentrate of O,O-diethyl-O-1-(2,4-dichlorophenyl)-2,2-dibromovinylphosphate, 280 g of kaolin, 140 g of synthetic silica of the Ultrasil type, 40 g of clutane (ligno-sulphonic acid sodium salt) and 5 g of Nekaline S (butylnaphthalene sulphonic acid sodium salt), and then mixing them in a high-speed paddle agitator.
What is claimed is:
1. A method of killing Colorado potato beetles, comprising contacting them with an insecticidal amount of a compound having the formula
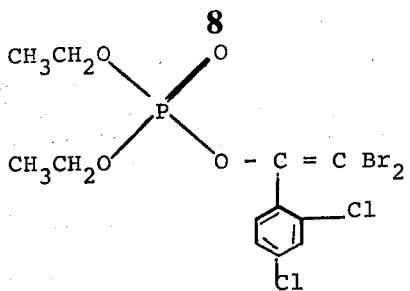

EXAMPLE 8